United States Patent [19]

Kotlair et al.

[11] Patent Number: 5,626,939

[45] Date of Patent: May 6, 1997

[54] SYNTHETIC WOOD FROM WASTE FIBROUS WASTE PRODUCTS

[75] Inventors: Abraham M. Kotlair, Athens, Ga.; Daniel P. Fountain, Kirksville, Mo.

[73] Assignee: Georgia Tech, Atlanta, Ga.

[21] Appl. No.: 523,257

[22] Filed: Sep. 5, 1995

[51] Int. Cl.$^6$ ...................................................... B32B 9/00
[52] U.S. Cl. .................................. 428/97; 428/87; 428/95; 428/96; 428/190; 428/198; 428/362; 428/370; 428/300.1; 525/143; 525/184; 525/423; 525/529; 524/561; 524/562; 427/180; 427/394; 156/72; 156/94; 156/153
[58] Field of Search ........................ 428/95, 96, 87, 428/97, 370, 190, 284, 286, 235, 237, 296, 297, 198, 362, 299, 85; 525/143, 184, 423, 429; 524/561, 562; 427/180, 394; 156/72, 94, 153

[56] References Cited

U.S. PATENT DOCUMENTS

| | | |
|---|---|---|
| 3,336,415 | 8/1967 | Kennedy ................... 260/831 |
| 3,498,841 | 3/1970 | Hefton et al. . |
| 3,646,157 | 2/1972 | Grosjenn et al. . |
| 3,668,278 | 6/1972 | Bonvicini et al. . |
| 3,788,940 | 1/1974 | Ogata et al. . |
| 4,383,084 | 5/1983 | Paschke et al. . |
| 4,555,566 | 11/1985 | Arita et al. . |
| 4,845,162 | 7/1989 | Schmitt et al. . |
| 5,213,866 | 5/1993 | Swope et al. ................... 428/95 |
| 5,234,993 | 8/1993 | Huynh-Ba . |
| 5,294,384 | 3/1994 | David et al. ................... 264/37 |

*Primary Examiner*—Patrick Ryan
*Assistant Examiner*—Abraham Bahta
*Attorney, Agent, or Firm*—Oldham & Oldham Co., L.P.A.

[57] ABSTRACT

A composition of matter and a process for the preparation thereof is disclosed for a fibrous composite (e.g., synthetic wood). The fibrous composite contains 50 to 95% by weight carpet and 5 to 50% by weight of a structural adhesive. Structural adhesives effective in this application would include phenol-formaldehyde resins, either of the resole or novalac type, phenol-formaldehyde resins that have at least one other co-monomer present, e.g., bis-phenol A, resorcinol, and other substituted phenols, urea-formaldehyde resins, melamine urea formaldehyde resins, tannin-phenol-formaldehyde resins, diisocyanate resin, epoxy resins, crosslinkable polyvinyl acetate, proteins, e.g., soy flour, blood and polyester resins. The process steps necessary for the formation of the fibrous composite would include at least the steps of shredding the carpet without component separation thereof to form carpet fibers, coating a resin on the carpet fibers to form resin coated fibers, curing the resin coated fibers under a pressure and a temperature sufficient to cure the resin and form a fibrous composite, and cooling the composite. The carpet is typically shredded to produce fibers of from 1/8 to 3/4 of an inch. In one aspect of the invention, fabric, either natural or synthetic is added to the shredded carpet.

48 Claims, 1 Drawing Sheet

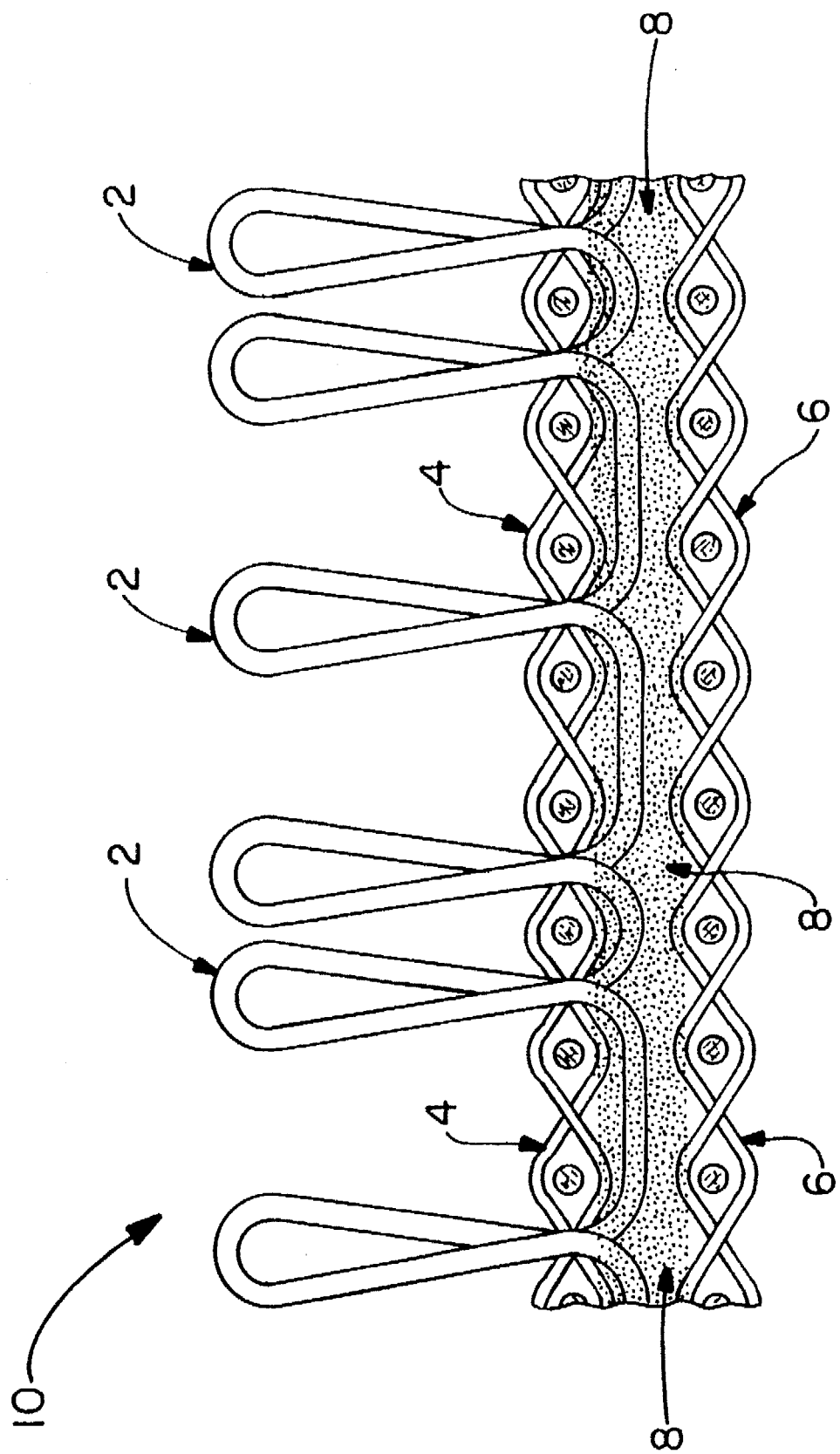

SYNTHETIC WOOD FROM WASTE FIBROUS WASTE PRODUCTS

TECHNICAL FIELD

The invention described herein pertains generally to a composition of matter and a method for producing a fiber filled composite by shredding waste or virgin carpet and/or waste or virgin fabric (bits or shreds), and coating their individual fibers with a low viscosity structural adhesive which is then cured. More specifically, in one embodiment, the present invention is directed to compositions of matter and methods for making a composite that utilizes the strength of the unmelted carpet face fibers to make a plastic composite which can be used as synthetic wood and other articles of commerce.

The invention further describes a composition of matter and a method for producing composites containing unmelted synthetic and natural fibers in combination with shredded carpet. These fibers may be present as small fabric pieces, yarns and individual fibers. These yarns and individual fibers can be obtained by shredding a waste fabric and/or waste carpet and these unsegregated fibers are added to small fabric pieces. The blended fibrous components are coated with a low viscosity structural adhesive which is then cured to a fibrous composite material by the application of heat and pressure. More specifically, the present invention is directed to compositions and methods for making a composite that utilizes the strength of the unmelted fabric, yarns and individual fibers to make a plastic composite which can be used as a synthetic wood or other articles of commerce.

BACKGROUND OF THE INVENTION

Limited landfill capacity and an increase in the environmental awareness and government regulations have spurred efforts for the recycling of post-consumer and post-industrial, synthetic and natural polymeric material. About 2 billion pounds of carpet is produced annually in the United States that starts showing up as waste after about seven years, and together with some 40 million pounds of waste carpet ends produced per year in the manufacture of carpets constitute a very serious environmental issue. It is this same limited landfill capacity that have also motivated efforts involving recycling of post-consumer and post-industrial synthetic and natural polymeric material. In the making of garments, about 15% of the fabric is waste. When the waste fabrics are blends, primarily polyester fibers and cotton fibers, this waste fabric (estimated to be about one billion pounds), is generally landfilled and constitutes a very serious environmental issue.

Typical conventional carpeting includes three primary components: (1) a face yarn that generally consists of nylon-6 or nylon-6,6 fibers with smaller amounts of polyester, polypropylene, acrylics, wool and cotton fibers; (2) a carpet backing that is generally made of polypropylene fibers with a much smaller amount of jute fibers; and (3) an adhesive material that is usually styrene-butadiene rubber and is applied as a latex and cured after application. The adhesive is usually filled with a very high melting inorganic material such as calcium carbonate. These typical carpet constructions are well known in the art and are exemplified in U.S. Pat. No. 4,643,930. Because of the diverse chemical structure of the melt incompatible fiber components of waste carpet, recycling of this material presents a particularly difficult technological challenge.

Previous efforts for disposing waste carpet materials by individuals and corporations have relied on burning the waste carpet in massive incinerators, separating the face yarn followed by depolymerization to recover the monomers of the polyamides or polyester material, or use of the face yarn in special products, using supercritical fluids to dissolve the face yarn, and melt extruding the unseparated carpet components into a polyblend composite, which is described in U.S. Pat. No. 5,294,384. The above processes have not been satisfactory from either environmental or economic factors, while the melt extruded polyblend has particularly weak interfacial adhesion between the incompatible blend components and does not produce a very satisfactory product.

Waste fabrics constitute another large source of waste fibers, however they are often composed of blended yarns and fibers. These fibers consist of the natural type, the major ones being cotton, wool and silk and the synthetic type, the major ones being polyester, nylons, acrylic and polyolefins. These fabrics are almost always dyed in a variety of colors and may contain a variety of surface additives. Because of the variable colors and fiber composition, little use can be found for these waste materials. However, this waste is produced at a very limited number of manufacturing sites, making collection a simpler task compared to the collecting from the general public. This material is also clean and can be readily shipped to central processing centers without special handling.

Previous efforts for disposing waste textile and home furnishing fiber materials by individuals and corporations have relied on: burning the waste fibrous materials in massive incinerators; separating the yarn by their density followed by depolymerization to recover the monomers of the polyamides or polyester material; using the fibers in special products such as cotton in paper making; using supercritical fluids to dissolve the fibers followed by precipitation; and melt extruding the unseparated carpet components into a polyblend composite. The above processes have not been satisfactory from either environmental or economic factors, while the melt extruded polyblend has particularly weak interfacial adhesion between the incompatible blend components and does not produce a very satisfactory product.

The above shortcomings are overcome by the technology described in the instant invention. Through the use of a structural adhesive which coats unsegregated carpet fibers and/or blends of unsegregated carpet fibers with fabric fibers, followed with subsequent curing of the structural adhesive through the application of heat and pressure, a fiber-filled composite is produced which has applicability as a replacement for natural wood products, thereby conserving another natural resource.

SUMMARY OF THE INVENTION

In accordance with the present invention, there is provided compositions of matter and processes wherein the recycling of waste carpet is achieved by shredding the carpet and coating the mixed, but unsegregated fiber components, and cured latex particles with a low viscosity structural adhesive that is dispersed or dissolved in a suitable solvent. The mixture of coated fibers are then heated to affect a cure of the resin coating by the application of heat and pressure into a fibrous composite that contains the unmelted face yarn fibers. The carpet backing fibers in the composite are present in either a melted or unmelted form. Because the weight ratio of waste face yarn to carpet backing fibers may vary depending on carpet type or whether carpet ends or whole carpet is used, segregated waste carpet components such as nylon-6, nylon-6,6, polyester, acrylonitrile, polypropylene and the like, may be also used to achieve the desired composition. The composite can be used as a wood substitute in applications such as sub-flooring, roofing materials, house siding, strand board, supports for outdoor signs, railings, and in outdoor applications where wood and metal are currently used in transportation and road construction.

The present invention also provides compositions and processes wherein the recycling of waste textiles and carpets are achieved by cutting the textile fabrics to small pieces and shredding the carpet and fabrics to individual fibers, yarns and small fiber bundles, and coating the mixed but unsegregated fiber components and cured latex particles, with a low viscosity structural adhesive that is dispersed or dissolved in a suitable solvent. The structural adhesive can also be present as a low melting solid that on melting has a low viscosity, e.g., 10 poise, to coat the fibers and fabric bits. The mixture, which may contain one or more components consisting of coated fibers, yarns, fiber bundles and fabric bits is then heated under applied pressure to affect a cure of the resin coating into a fibrous composite that contains the unmelted fabrics bits, fibers, yarns and fiber bundles. The polyolefin fibers that may be present in the waste fibrous mixture may be processed in either a melted or unmelted form depending on the processing temperature selected. Because this polyolefin fiber component does not strongly adhere to structural adhesives, the weight ratio of this fiber component to the strongly adherent fibers, such as nylon, polyester, acrylics, cotton, wool and silk, will primarily determine the mechanical strength of the composite for a given amount of structural adhesive and curing conditions. The presence of the polyolefin when melted during the curing conditions does provide for viscous flow during the processing step which can be very important particularly in the extrusion procedure for making the composite. The cured composite can be used as a wood substitute in applications such as sub-flooring, roofing materials, house siding, strand board, supports for outdoor signs, railings, and in outdoor applications where wood and metal are currently used in transportation and road construction.

These and other objects of this invention will be evident when viewed in light of the drawing, detailed description, and appended claims.

BRIEF DESCRIPTION OF THE DRAWING

The invention may take physical form in certain parts and arrangements of parts, a preferred embodiment of which will be described in detail in the specification and illustrated in the accompanying drawing which form a part hereof, and wherein:

FIG. 1 is a side plan view shown in partial cross-section of a carpet showing face yarns, primary backing, secondary backing and adhesive(s).

DETAILED DESCRIPTION OF THE INVENTION

Referring now to the drawing wherein the showings are for purposes of illustrating the preferred embodiment of the invention only and not for purposes of limiting the same, the FIGURE shows a typical carpet composition useful in the present invention, the application of which is useful for converting shredded waste carpet and/or fabric bits or shredded fabrics into a plastic composite containing unmelted face yarn fibers, and depending on the composite characteristics, unmelted fiber backing. As seen in FIG. 1, the typical carpet (10) will contain a plurality of pile or face yarns (2) which are interspersed throughout a primary backing (4) and adhered to the primary backing by adhesive (8). Generally the carpet contains a secondary backing (6) to contain the adhesive.

The best mode for carrying out the invention will now be described for the purposes of illustrating the best mode known to the applicant at the time. The examples are illustrative only and not meant to limit the invention, as measured by the scope and spirit of the claims.

The first step in the process is to take at least one carpet sample and shredding it without component separation. Conventional means of shredding that employ rotating and stationary sets of blades, for example a Banbury type cutter may be used. An unseparated carpet sample is one that has not been modified to remove or separated out one of its primary components (face yarn, backing and adhesive) from the sample prior to processing. As the carpet sample is processed in its unseparated form, the fiber contents can be expected to have a range of compositions depending on the carpet type and face yarn weight as is indicated in Table 1.

TABLE 1

| Component | Percentage |
| --- | --- |
| Face yarn | 10 to 70% |
| Polyolefin | 5 to 35% |
| Latex (SBR) | 5 to 30% |
| Inorganic Filler | 10 to 30% |

The variable content and type of the face yarn in waste carpets may require the addition of segregated face yarn, cut fabric bits and shredded fabric fibers, or carpet backing to the shredded carpet sample to achieve a desired face yarn content and type for target properties of a particular fibrous composite. The carpet sample need not have a preferred fiber type. The face yarn can be any synthetic or natural carpet fiber type or a blend of carpet face yarn types. When the face yarn is a polyolefin such as polypropylene, it can still be used with the provision that an addition of face yarn, fabric bits or shredded fabric fibers, other than a polyolefin be made to achieve the desired weight ratio of a strongly bonding fiber, such as nylon, polyester and cotton to the structural adhesive to improve the mechanical properties because the polyolefin and latex phases are only weakly bonded to the structural adhesives. The weak bonding of the cured structural adhesives to the polyolefin and latex phases is important in that they improve the impact properties of the composite. This improvement occurs by the debonding of the polypropylene and latex phases from the matrix adhesive under impact which helps stop the crack propagation that can lead to failure of the material.

The waste carpet should be reasonable free of dirt primarily to ascertain that the face yarn is in the desired composition range for the particular application. The sample may also contain dyes, coating materials, treatment compositions or additives that impart stain and soil resistance, luster modification and other desirable characteristics. The carpet or shredded carpet fibers may be washed prior to use and surface water removed. The fibers need not be dried prior to use, although it is desirable to have a good estimate of the water content to obtain the desired formulation of face yarn to polyolefin to latex to structural adhesive contents when the face yarns are polyamides, or contain considerable amounts of cotton, wool, jute and other fibers that can absorb significant amounts of water.

The carpet sample need not be used carpet. Carpet trimming produced during manufacture of carpets or carpets containing defects may also be used. The pile height of the carpet is also of no consequence because the average face yarn content of the shredded carpet sample is determined prior to use and appropriate amounts of face, backing fibers, fabric bits or fabric fibers added as required for a particular product. The amounts of each component present in carpet can be readily determined by classification using their density differences or by preferential solvent extraction. The shredding of the carpet to obtain separated fibers to be coated by the adhesive can be achieved by a number of processes that utilize rotating blades such as a Banbury or Wilely mill while the fabric bits can be obtained by cutting or shredding into fibers by using a Garnett device. The process can be batch or continuous. Turbulent air streams are very effective in separating the individual fibers after being cut. Fiber lengths ranging from ~1/8 to ~3/4 inch are generally encountered and are satisfactory for the resin coating and curing process. The resins used as structural adhesives are low viscosity prepolymers such as, but not limited to:

(1) Phenol-formaldehyde resins, either of the resole or novalac type;

(2) Phenol-formaldehyde resins that may have other co-monomers present, such as bis-phenol A, resorcinol, and other substituted phenols;

(3) Urea-formaldehyde resins;

(4) Melamine urea formaldehyde resins;

(5) Tannin-phenol-formaldehyde resins;

(6) Diisocyanate resin;

(7) Epoxy resins;

(8) Crosslinkable polyvinyl acetate;

(9) Protein type such as soy flour, blood, etc.; and

(10) Polyester resins.

Those skilled in the art can readily formulate the phenol formaldehyde resins to contain various ratios of phenol to formaldehyde, co-monomers such as bisphenol, resorcinol and other substituted phenolics to enhance particular properties of the resin such as strength, water repellency and curing rates and curing temperatures. Similarly the other resin types can be modified to achieve desired characteristics, but are still considered belonging to one of the above general groups. The above general types of resins are commercially available from a number of commercial sources and these commercial sources may provide their proprietary compositions to help meet the desired characteristics of the composite. The above general resin types may be catalyzed, mixed with one another, contain wetting agents, flame retarders and water repellents. Water soluble thickening agents may be added to enhance tack in the pre-pressing stage when the composites are made by molding. Because the thickness of these fibers is very small, generally about 50 to 70 microns, the viscosity of the coating solution should low enough to readily coat each individual fiber and be in the sprayable range. For cost, safety, and environment friendliness, the solvent of the coating solution should be preferably water or water alcohol mixture. Viscosities of below 100 poise are generally satisfactory and those between about 10 to 50 poise are generally preferred.

The coating can be carried out in a device that spays, drips or rolls a coating of resin on the fibers that may then be mixed prior to curing the composite. Although it is preferable for the coating resin be dispersed or dissolved in a liquid, powdered resins that melt to a sufficiently low viscosity to completely coat the fibers during processing may be used. The melting point of the resin should be below the temperature where significant curing of the resin occurs.

After coating the individual fibers with the appropriate resin, the coated fibers are cured by the application of heat and pressure to form a fiber filled composite. This curing process can be carried out in a press at temperatures below and above the melting point of polypropylene. A temperature range of 150° to 190° C. is satisfactory for sufficiently rapid curing, removal of the resin solvent and other volatile reaction products. The material may be also extruded under a time-temperature set of parameters that lead to "B" staged condition of the adhesive. A vented extruder is desirable in this process to allow the removal of solvent and volatile reaction products. The extruded material is then heated in an oven to complete the cure. This final cure can take place under tension, pressure or in a container that can be opened. Cooling under pressure, tension or in a container to prevent product distortion may be desirable. The extruder can be of a single screw type, a twin screw type, or an injection molding device. The composite can also be made by carrying out the heating process between heated rolls or belts and the like. After the initial heating and pressing by the heated rolls, the heating must be continued under tension to continue the cure. Pressure on the material during post roll cure may be advantageous in preventing warping of the product. The curing temperature can be carried out at slightly above room temperature to below the melting or degradation of the non-polyolefinic fibers present. The preferred temperature range is about 150° to 190° C.

The analysis of the nylon face yarn contents of the nylon waste carpets used in the samples described below is carried out by slurring the waste carpet fibers in 10% formic acid to dissolve out the acid extractable filler. The carpet fibers were then slurried in 89% formic acid to remove the nylon-6 and nylon-6,6 present. The specific nylon present was determined by the respective melting points. The waste carpet ends used in the examples below contained both nylon-6 and nylon-6,6 fibers. The waste carpet did not contain any measurable amounts of acrylic or polyester fibers. The present invention is illustrated by the following examples.

EXAMPLE #1

A sample of carpet ends containing 20 weight percent nylon face yarn, 10 weight percent of acid extractable filler and 70 weight percent combination of polypropylene, styrene butadiene rubber (SBR) latex and nonextractable filler, was shredded in a double bladed cutter fitted with a screen having 0.25 inch openings. The shredding process produced cut fibers that contained a small fraction of face yarn and backing yarn bundles. The fiber sample was then air sprayed with a phenolic resole type resin, Varcum® 9-2600, supplied by Oxychem Chemical Company, to contain 20 dry weight percent of the resin. The sample was pressed in press at 140° C. for 20 minutes under an initial pressure of 250 psi. The mechanical properties for the fibrous composite are listed in Table 2. For comparative purposes, measured mechanical properties of a random piece of plywood (both perpendicular and parallel to the surface fibers), particle board, oriented strand board, and literature values for molded nylon, polyester, polypropylene, phenol formaldehyde and urea formaldehyde are included in Table 2.

EXAMPLE #2

The shredded carpet sample used in example #1 was air sprayed with a novalac type phenolic resin to contain (dry weight) 17 weight percent Kesorciphen® A, added as 2 weight % Resorciphen® A, 0.5 weight % hexamethylenetetramine (HMT) (supplied by Indespect Chemical Company). The coated carpet fibers were heated in a press at 180° C. under a pressure of 530 psi for 10 minutes. The mechanical properties are listed in Table 2. Comparison of the results of examples #1 and #2 show that a more complete cure of the structural adhesive and an increase in the pressure during the curing cycle results in improved mechanical properties.

EXAMPLE #3

The shredded carpet sample described in example #1 was air sprayed with a novalac type phenolic resin to contain 17 weight % Resorciphen® A, added as 2 weight % Resorciphen® A, 0.5 weight % hexamethylenetetramine (HMT) (supplied by Indespect Chemical Company). The coated carpet fibers were heated in a press at 185° C. under a pressure of 530 psi for 10 minutes. The mechanical properties are listed in Table 2. The improvement in the mechanical properties compared to example #2 indicates that the higher mold temperature of 185° C. affected a more complete cure of the structural adhesive.

EXAMPLE #4

To the shredded carpet described in example #1, segregated nylon fibers from shredded waste carpets, obtained by an air classification procedure, was added to the sample so that the face yarn content was increased to 48 weight %. The enhanced face yarn carpet blend was coated with 20 weight % Bisphenol type resole phenolic resin (dry weight) Varcum® 29-382, supplied by Oxychem Chemical Company and cured at 200° C. for 10 minutes at a pressure of 800 psi. The mechanical properties listed in Table 2 were significantly enhanced by the addition of nylon face yarn.

EXAMPLE #5

To determine whether the higher cure temperature of 200° C. was necessary to achieve the higher strength of the composite, a shredded carpet described in example #4 was coated with a 20 weight percent (dry weight) bisphenol type resole phenolic resin Varcum® 29-382, supplied by Oxychem Chemical Company and cured at 180° C. for 10 minutes at a pressure of 800 psi. The mechanical properties listed in Table 2 indicate that the cure temperature of 180° C. is better than 200° C.

EXAMPLE #6

To ascertain whether melting of the polyolefin backing is required to achieve good mechanical properties, the shredded fiber mixture used in example #5 and coated with a 20 weight percent (dry weight) bisphenol type resole phenolic resin, Varcum® 29-382 supplied by Oxychem Chemical Company, and cured at 160° C. for 15 minutes at a pressure of 800 psi. The mechanical properties for this material is listed in Table 2 show that satisfactory mechanical properties can be achieved with a cure temperature below the melting point of polypropylene of about 170° C. provided that the time at the selected temperature is sufficiently long to affect a sufficient cure of the structural adhesive.

EXAMPLE #7

A shredded waste carpet sample, which was air classified to increase the nylon face content to 78 weight percent, was spray coated with water slurry of an urea formaldehyde resin, ChemBond® supplied by the Nestle Corporation, to attain a 10 weight % (dry weight of resin) coating on the fibers. The coated fibers were heated under a pressure of 525 psi at 180° C. for 12 minutes. The mechanical properties are listed in Table 2. Good mechanical properties were achieved. The results indicate that other structural adhesives such as urea formaldehyde can achieve satisfactory mechanical properties and that no large increase in mechanical properties are achieved with face yarn contents greater than about 50 weight percent.

EXAMPLE #8

The shredded waste carpet sample used in example #7 having a face yarn content of 78 weight percent was spray coated with a water solution of an urea formaldehyde resin ChemBond®, supplied by the Nestle Cooperation, to contain 20 weight percent dry weight resin. The coated fibers were pressed at 180° C. and a pressure of 525 psi for 10 minutes. The results for the mechanical properties are listed in Table 2. An increase in the resin content from 10 to 20 dry weight percent resulted in a slight decrease in the mechanical properties of the fibrous composite.

EXAMPLE #9

To provide a more direct comparison of the mechanical properties between urea formaldehyde resins and phenol formaldehyde resins, the shredded carpet fiber used in example #7, was coated with a phenol formaldehyde resin, Resi-Stran™ supplied by Georgia-Pacific Corporation, so that the fibers contained 10 weight % (dry weight) of resin. The sample was molded at 180° C. and a pressure of 350 psi of 10 minutes. The results shown in Table 2 indicate that this particular phenolic resin used gave slightly better mechanical properties than the particular urea formaldehyde used.

EXAMPLE #10

To demonstrate the effect of the amount of face yarn present other than polyolefins, a carpet containing 14 weight % nylon, 66 weight % polyolefin and 20 weight % latex, was coated with 10 weight percent (dry weight) Resi-Straff™, a resole type phenol formaldehyde resin supplied by Georgia Pacific Corporation. The coated fibers were molded at 180° C. for 10 minutes under a pressure of 350 psi. The resulting mechanical properties shown in Table 2 indicate that the lower face yarn content gave satisfactory mechanical properties, although somewhat lower than fiber composites containing larger amounts of nylon face yarn.

EXAMPLE #11

To demonstrate that shredded carpets containing face yarns other than nylons, polyester fibers, another common fiber found in the face yarns of carpets, were added to the carpet sample used in example #10 so that the total face yarn content was 50 weight percent. The shredded carpet fibers were coated with Resi-Stran™ resin used in example #10 and molded at 180° C. for 10 minutes under a pressure of 350 psi. The mechanical properties listed in Table 2 show that other carpet face yarns which have functional groups that strongly bond to structural adhesives listed above, namely acrylics, polyesters, and wool, can be used to make fibrous composites from waste carpets.

TABLE 2

| Ex. | Tensile Strength[1] | Tensile Modulus[2] | Flexural Strength[3] | Flexural Modulus[4] |
| --- | --- | --- | --- | --- |
| 1 | 320 | 12,000 | | |
| 2 | 900 | 22,000 | | |
| 3 | 1,400 | 34,000 | | |
| 4 | 1,500 | 39,000 | | |
| 5 | 2,200 | 43,000 | | |
| 6 | 2,000 | 48,000 | | |
| 7 | 1,700 | 51,000 | | |
| 8 | 1,500 | 35,000 | | |
| 9 | 2,000 | 56,000 | | |
| 10 | 1,500 | 36,000 | | |
| 11 | | | 2,900 | 142,000 |
| Plywood parallel | 2,000 | 92,000 | 3,200 | 152,000 |
| Plywood perpendicular | 5,000 | 156,000 | 6,900 | 500,000 |
| Strand Board oriented | 1,800 | 150,000 | 4,500 | 430,000 |
| Nylon[5] | 11,000 | 200,000 | 6,700 | 185,000 |
| Polyester[5] | 8,000 | 280,000 | 4,400 | 350,000 |
| Polypropylene[5] | 5,000 | 185,000 | 7,000 | 200,000 |
| Phenol Formaldehyde[5] | 7,500 | 800,000 | 13,000 | |

[1]ASTM D638
[2]ASTM D638
[3]ASTM D790
[4]ASTM D790
[5]Literature values

In a second embodiment of this invention, the above invention can be expanded to include small waste fabric pieces and shredded waste fabric and carpet into plastic composites containing the unmelted fabrics, fiber bundles, yarns and fibers, and depending on the process for making the composite and the desired characteristics, unmelted or melted polyolefin fabric bits, yarn bundles, yarns and fibers. The first step in the process is to take at least one fabric that may be knitted, woven or non-woven, that has been cut into bits and/or shredded, to which a shredded carpet as has been described previously, is added, and the material mixed without component separation. The fabric can be cut by blades or shredded by a Garnett type machine.

Although the fabric and carpet samples can be expected to have a range of compositions, particularly with respect to the polyolefin content, the primary parameters controlling the physical properties are the weight fraction of the structural adhesive, the weight ratio of non-polyolefinic to polyolefinic fibers and the curing process. The ratio of polyolefin to other waste fibers can be determined from measurements of the enthalpy of melting below 175° C., (the polyolefins being the lowest melting point components that will be encountered), using standard differential thermal analysis or extraction of the sample with a solvent for polyolefins such as decalin. To achieve specific fiber compositions, it may be necessary to add segregated face yarn, carpet backing and textile fibers to the fibrous sample to achieve the correct ratio of components for the desired physical properties of the final product.

The coated fibrous sample need not have a preferred fiber composition, e.g., specific amounts of polyester, cotton, nylon, polypropylene and the like. One important factor is the ratio of strongly resin bonding fibers to the weakly bonding resin bonding polyolefinic fibers. The strongly resin bonding fibers to polyolefin fiber ratio can range from 10 to 100 weight percent, preferably about 50 weight percent. The structural adhesive content can range from 5 to 50 weight percent or higher. Higher amounts of polyolefin and resin are generally preferred in an extrusion process where the polyolefin is melted compared to a molding process, where the polyolefin may or may not be melted, because of the need for higher fluidity of the material.

The waste carpet samples should be reasonably free of dirt primarily to ascertain the face yarn and backing contents. The sample may also contain dyes, coating materials, treatment compositions or additives that impart stain and soil resistance, luster modification and other desirable characteristics. These additives need not be removed or determined. The carpet or shredded carpet fibers may be washed prior to use and surface water removed. The fibers need not be dried prior to use, although it is desirable to have a good estimate of the water content to obtain the desired formulation of non-polyolefinic/polyolefin/structural adhesive contents when the fibers that may contain considerable amounts of cotton, wool, jute, nylons and other fibers that can absorb significant amounts of water. The water content can be readily determined by the weight loss on drying a test amount of the fiber at 110° C. The amount of polyolefin can be obtained by extraction of the polyolefin with hot decalin. The cured latex and non-polyolefinic fibers will not dissolve in this solvent.

The fabric need not have a specific composition or fabric construction. Knitted or woven or non-woven fabrics can be used. The fabric can be shredded into fibers, yarns and fiber bundles using a Garnett type device or cut into small fabric bits using blades in a number of geometries. The size of the fabric bits is not critical, but squares which are about 1 inch, preferably ½ inch squares, are used to give the composite a fairly uniform composition. Because the fabrics are fairly clean, they usually need no further treatment. Surface additives do not need to be removed. Because the nature of the fabric composition, other than its polyolefin content, need not be determined, the weight fraction extracted on a representative sample of the fabric with decalin is sufficient characterization. When the sample contains a hydrophilic fiber such as cotton, drying of the sample is preferred to achieve an accurate weight of the fibrous component.

After coating the individual fibers with the appropriate resin, as mentioned previously, the coated fibers are cured by the application of heat and pressure to form a fiber filled composite. The curing process can be carried out in a press at temperature below and above the melting point of polypropylene. Although the structural adhesives can be cured from room temperature to about 210° C., the preferred temperature range is 140°–200° C. This allows water and other solvents to be removed during the curing cycle. The material may be extruded under a time-temperature set of conditions that leads to a "B" staged resin conditions, i.e., the resin is still flowable under a stress. The extruded material is then heated in an oven to complete the cure. This final cure can take place under tension, pressure or in a container that can be opened. Cooling under pressure, tension or in a container to prevent product distortion may be desirable. The extruder can be of a single screw type, a twin screw type, or an injection molding device providing the material can be vented to remove water and solvent. The composite can also be made by carrying out the heating process between heated rolls or belts or the like. After the initial heating and pressing by the heated rolls, the heating must be continued under tension to continue the cure. Pressure on the material during post-roll cure may be advantageous in preventing warping of the product.

The following non-limiting illustrative examples would demonstrate this aspect of the invention.

EXAMPLE #12

A waste cotton-polyester fabric containing 60 weight percent polyester was cut into one inch squares and was spray coated with a phenol formaldehyde resin, Resi-Stran™ supplied by Georgia Pacific Corporation, and cured in a press at 190° C. for 10 minutes under a pressure of 500 psi. The composite was then cooled in the press (the platen was bored for water cooling) to about 43° C. The mechanical properties are listed in Table 3. Examination of the composite indicated that all parts of the fabric may not have been equally coated, a limitation of the spray coating device employed, and is the probable cause for the low strengths and moduli.

EXAMPLE #13

A shredded waste carpet containing 14 weight percent nylon, 66 weight percent polyolefin and 20 weight percent latex, was mixed with cotton fibers to achieve a 50 weight percent nylon plus cotton overall fiber blend. This blend was coated with 10 weight percent (dry weight) Resi-Stran™, a resole type phenol formaldehyde resin supplied by Georgia Pacific Corporation. The coated fibers were molded at 190° C. for 10 minutes under a pressure of 500 psi. The fibrous composite was cooled in the press to 43° C. The mechanical properties are listed in Table 3. This composite compares favorably with oriented strand board and plywood that are also listed in Table 3.

EXAMPLE #14

A shredded waste carpet containing 14 weight percent nylon, 66 weight percent polyolefin and 20 weight percent latex, was mixed with polyester fibers to achieve a 50 weight percent nylon plus polyester overall fiber blend. This blend was coated with 10 weight percent (dry weight) Resi-Stran™, a resole type phenol formaldehyde resin supplied by Georgia Pacific Corporation. The coated fibers were molded at 190° C. for 10 minutes under a pressure of 500 psi. The fibrous composite was cooled in the press to 43° C. The mechanical properties are listed in Table 3. This composite compares favorably with oriented strand board and plywood that are also listed in Table 3.

EXAMPLE #15

A shredded waste carpet containing 14 weight percent nylon, 66 weight percent polyolefin and 20 weight percent latex, was mixed with a blend of 50-50 cotton and polyester fibers to achieve a 50 weight percent nylon plus cotton plus polyester overall fiber blend. This blend was coated with 10 weight percent (dry weight) Resi-Stran™, a resole type phenol formaldehyde resin supplied by Georgia Pacific Corporation. The coated fibers were molded at 190° C. for 10 minutes under a pressure of 500 psi. The fibrous composite was cooled in the press to 43° C. The mechanical properties are listed in Table 3. This composite compares favorably with oriented strand board and plywood that are also listed in Table 3.

EXAMPLE #16

A shredded waste carpet containing 14 weight percent nylon, 66 weight percent polyolefin and 20 weight percent latex, was mixed with fabric bits (60 weight percent polyester and 40 weight percent cotton) to achieve a 50 weight percent nylon plus polyester plus cotton overall fiber blend. This blend was coated with 10 weight percent (dry weight) Resi-Stran™, a resole type phenol formaldehyde resin supplied by Georgia Pacific Corporation. The coated fibers were molded at 190° C. for 10 minutes under a pressure of 500 psi. The fibrous composite was cooled in the press to 43° C. The mechanical properties are listed in Table 3. This composite compares favorably with oriented strand board and plywood that are also listed in Table 3.

EXAMPLE #7

A shredded waste carpet containing 14 weight percent nylon, 66 weight percent polyolefin and 20 weight percent latex was mixed with nylon fibers to achieve a 50 weight percent of nylon. The blended fibers were coated with 10 weight percent (dry weight) Resi-Stran™, a resole type phenol formaldehyde resin supplied by Georgia Pacific Corporation. The coated fibers were molded at 190° C. for 10 minutes under a pressure of 500 psi. The fibrous composite was cooled in the press to 43° C. The mechanical properties are listed in Table 3. This composite compares favorably with oriented strand board and plywood that are also listed in Table 3.

EXAMPLE #18

A shredded waste carpet containing 14 weight percent nylon, 66 weight percent polyolefin and 20 weight percent latex was mixed with equal amounts of cotton and polyester fibers to achieve a 50 weight percent of cotton plus polyester plus nylon. The blended fibers was coated with 10 weight percent (dry weight) ChemBond®, a urea formaldehyde resin supplied by the Nestles Corporation. The coated fibers were molded at 190° C. for 10 minutes under a pressure of 500 psi. The fibrous composite was cooled in the press to 43° C. The mechanical properties are listed in Table 3. The results indicate that the urea formaldehyde resin is as good or better than with the use of phenol formaldehyde resin in example #15.

EXAMPLE #19

A shredded waste carpet containing 14 weight percent nylon, 66 weight percent polyolefin and 20 weight percent latex was mixed with cotton fibers to achieve a 50 weight percent of cotton plus nylon. The blended fibers were coated with 10 weight percent (dry weight) ChemBond®, a urea formaldehyde resin supplied by the Nestles Corporation. The coated fibers were molded at 190° C. for 10 minutes under a pressure of 500 psi. The fibrous composite was cooled in the press to 43° C. The mechanical properties are listed in Table 3. These results are similar to the properties found in example #13 showing that urea formaldehyde structural adhesives give equivalent properties to phenol formaldehyde structural adhesives.

EXAMPLE #20

A waste cotton-polyester fabric containing 60 weight percent polyester was out into one inch squares and was spray coated with 20 weight percent (dry weight) urea formaldehyde resin, ChemBond®, supplied by the Nestles Corporation, and cured in a press at 190° C. for 10 minutes under a pressure of 500 psi. The composite was then cooled in the press (the platen was cored for water cooling) to about 43° C. The mechanical properties are listed in Table 3. These properties are equivalent to fiber board.

EXAMPLE #21

A shredded waste carpet containing 14 weight percent nylon, 66 weight percent polyolefin and 20 weight percent latex, was mixed with fabric tufts (60 weight percent polyester and 40 weight percent cotton) to achieve a 50 weight percent nylon plus polyester plus cotton overall fiber blend. This blend was coated with 10 weight percent (dry weight) ChemBond®, a urea formaldehyde resin supplied by the Nestles Corporation. The coated fibers were molded at 190° C. for 10 minutes under a pressure of 500 psi. The fibrous composite was cooled in the press to 43° C. The mechanical properties are listed in Table 3. This composite tensile and flexural strengths compare favorably with oriented strand board and plywood that are also listed in Table 3.

EXAMPLE #22

A shredded waste carpet containing 14 weight percent nylon, 66 weight percent polyolefin and 20 weight percent latex was mixed with nylon fibers to achieve a 50 weight percent of nylon. The blended fibers were coated with 10 weight percent (dry weight), ChemBond®, a urea formaldehyde resin supplied by the Nestles Corporation. The coated fibers were molded at 190° C. for 10 minutes under a pressure of 500 psi. The fibrous composite was cooled in the press to 43° C. The mechanical properties are listed in Table 3. The mechanical properties compare favorably with particle board.

TABLE 3

| Ex. | Tensile Strength[1] | Tensile Modulus[2] | Flexural Strength[3] | Flexural Modulus[4] |
| --- | --- | --- | --- | --- |
| 12 | 360 | 28,000 | 1,500 | 62,000 |
| 13 | 1,900 | 86,000 | 4,600 | 184,000 |
| 14 | 1,200 | 75,000 | 3,000 | 142,000 |
| 15 | 1,700 | 71,000 | 4,600 | 193,000 |
| 16 | 3,000 | 119,000 | 6,500 | 294,000 |
| 17 | 690 | 28,000 | 2,500 | 98,000 |
| 18 | 2,800 | 117,000 | 5,700 | 195,000 |
| 19 | 1,400 | 92,000 | 4,300 | 188,000 |
| 20 | | | 2,200 | 301,000 |
| 21 | 2,500 | 114,000 | 6,000 | 223,000 |
| 22 | | | 2,900 | 92,000 |
| Plywood parallel | 2,200 | 92,000 | 3,200 | 152,000 |
| Plywood perpendicular | 5,000 | 156,000 | 6,900 | 495,000 |
| Strand Board oriented | 1,800 | 149,000 | 4,500 | 427,000 |
| Particle Board | 640 | 64,000 | 2,000 | 83,000 |

[1]ASTM D368
[2]ASTM D368
[3]ASTM D790
[4]ASTM D790
[5]Literature values

While the examples so far have concentrated on the use of waste carpet and/or carpet with added fabric shreds or pieces, in yet a third embodiment of this invention, it is envisioned to utilize waste fabric bits and/or waste fabric fibers which are then blended with waste or virgin plastics such as polyethylene or polypropylene. The blend is then extruded above the melting point of the polyolefin.

EXAMPLE #23

Waste socks composed of 60 weight percent polyester and 40 weight percent cotton were shredded into fibers, fiber bundles and yarn. The shredded materials were coated with 15 weight percent Resi-Stran™, a resole-type phenol formaldehyde resin supplied by Georgia Pacific Corp. The material was cured at 190° C. for 15 minutes under a pressure of 500 psi. The material was cooled in the press to 43° C. A tensile strength of 820 psi and a tensile modulus of 82,000 psi were measured. A flexural strength of 1,900 psi and a flexural modulus of 120,000 psi were also obtained.

EXAMPLE #24

Waste socks composed of 60 weight percent polyester and 40 weight percent cotton were shredded into fibers, fiber bundles and yarn. The shredded materials were mixed with waste carpet described in example #13 to achieve an overall nylon plus polyester of 50 weight percent. The blend was coated with 10 weight percent of Resi-Stran™, a resole-type phenol formaldehyde resin supplied by Georgia Pacific Corp. The material was cured at 190° C. for 15 minutes under a pressure of 500 psi. The material was cooled in the press to 43° C. A tensile strength of 3,000 psi and a tensile modulus of 116,000 psi were measured. A flexural strength of 6,000 psi and a flexural modulus of 300,000 psi were also obtained.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A fibrous composite which comprises:
    (a) 10 to 95% by weight carpet, the carpet comprising an unmelted face yarn, a backing, and a fiber adhesive; and
    (b) 5 to 90% by weight of a structural adhesive.
2. The composite of claim 1 wherein the carpet comprises
    (a) 10 to 70% by weight of face yarn;
    (b) 5 to 35% by weight of backing; and
    (c) 5 to 30% by weight fiber adhesive.
3. The composite of claim 2 wherein the carpet further comprises an inorganic filler.
4. The composite of claim 3 wherein the inorganic filler is 10 to 30% by weight.
5. The composite of claim 1 wherein the face yarn is selected from the group consisting of polyamide, polyester, polyolefin, polyacrylic, polyacrylonitrile, wool, cotton fibers and blends or mixtures thereof.
6. The composite of claim 5 wherein the face yarn is polyamide.
7. The composite of claim 6 wherein the face yarn is selected from the group consisting of nylon-6 and nylon-6,6.
8. The composite of claim 1 wherein the backing comprises a polyolefin.
9. The composite of claim 8 wherein the backing further comprises a jute fiber.
10. The composite of claim 1 wherein the fiber adhesive comprises a latex rubber which is cured after application.
11. The composite of claim 10 wherein the latex rubber is a styrene-butadiene rubber.
12. The composite of claim 1 wherein the structural adhesive is selected from the group consisting of phenol-formaldehyde resins, phenol-formaldehyde resins that have at least one other co-monomer, urea-formaldehyde resins, melamine urea formaldehyde resins, tannin-phenol-formaldehyde resins, diisocyanate resin, epoxy resins, crosslinkable polyvinyl acetate, proteins and polyester resins and blends thereof.
13. The composite of claim 12 wherein the at least one other co-monomer is selected from the group consisting of bis-phenol A, resorcinol and substituted phenols.

14. The composite of claim 1 which further comprises a fabric selected from the group consisting of natural fabric, synthetic fabric and blends thereof.

15. The composite of claim 14 wherein the natural fabric is selected from the group consisting of cotton, wool, silk and blends thereof and the synthetic fabric is selected from the group consisting of polyester, polyamide, polyacrylic, polyolefin and blends thereof.

16. The composite of claim 15 wherein the fabric is shredded or cut into no more than 4 inch squares.

17. The composite of claim 16 wherein the fabric is cut into no more than 1 inch squares.

18. A process for the formation of a fibrous composite from a carpet comprising a face yarn, a backing and a fiber adhesive, comprising the steps of:
   (a) shredding the carpet without component separation thereof to form carpet fibers;
   (b) coating a resin on the carpet fibers to form resin coated fibers;
   (c) curing the resin coated fibers under a pressure and a temperature below the melting point of the face yarn to cure the resin and form a fibrous composite: and
   (d) cooling the composite.

19. The process of claim 18 wherein the step of shredding the carpet is by a fixed or rotating blade cutter which produces carpet fibers which are from ⅛ to ¾ of an inch.

20. The process of claim 18 wherein the step of coating includes the addition of a solvent.

21. The process of claim 20 wherein the solvent is selected from the group consisting of water, alcohol and mixtures thereof.

22. The process of claim 21 wherein the viscosity of the solvent and resin mixture is 10 to 50 poise.

23. The process of claim 18 wherein the step of curing is from 150° C. to 190° C.

24. The process of claim 18 which further includes the step of drying the carpet fibers.

25. The process of claim 18 wherein the fibrous composite is molded below the melting point of the backing.

26. The process of claim 25 wherein the temperature is above the melting point of the backing and below the melting point of the face yarn.

27. The process of claim 18 wherein the fibrous composite is extruded above the melting point of the backing and below 200° C.

28. The process of claim 27 which further comprises the step of curing the composite external to the extrusion process.

29. The process of claim 18 wherein the step of heating the resin coated fibers is by heated rolls in the temperature range of 40° C. to 200° C.

30. A process for the formation of a fibrous composite from a carpet comprising a face yarn, a backing and a fiber adhesive, and a fabric, comprising the steps of:
   (a) shredding the carpet without component separation thereof to form carpet fibers;
   (b) shredding or cutting the fabric and mixing the fabric with the carpet fibers, the steps of (a) or (b) being interchangeable, to form a mixed carpet/fabric material;
   (c) coating a resin on the material to form resin coated material;
   (d) curing the resin coated material under a pressure and a temperature below the melting point of the face yarn to cure the resin and form a fibrous composite material; and
   (e) cooling the composite material.

31. The process of claim 30 wherein the step of shredding the carpet is by a fixed or rotating blade cutter which produces carpet fibers which are from ⅛ to ¾ of an inch and wherein the step of shredding the fabric is by a fixed or rotating blade cutter which produces fabric material no larger than 1 inch squares.

32. The process of claim 30 wherein the step of coating includes the addition of a solvent.

33. The process of claim 32 wherein the solvent is selected from the group consisting of water, alcohol and mixtures thereof.

34. The process of claim 33 wherein the viscosity of the solvent and resin mixture is 10 to 50 poise.

35. The process of claim 30 wherein the step of curing is from 150° C. to 190° C.

36. The process of claim 30 which further includes the step of drying the carpet fibers.

37. The process of claim 30 wherein the fibrous composite material is molded below the melting point of the backing.

38. The process of claim 37 wherein the temperature is above the melting point of the backing and below the melting point of the face yarn.

39. The process of claim 30 wherein the fibrous composite is extruded above the melting point of the backing and below 200° C.

40. The process of claim 39 which further comprises the step of curing the composite external to the extrusion process.

41. The process of claim 30 wherein the step of heating the resin coated material is by heated rolls in the temperature range of 40° C. to 200° C.

42. A process for the formation of a fibrous composite from a fabric comprising the steps of:
   (a) shredding or cutting the fabric;
   (b) coating a resin on the fabric to form resin coated fabric;
   (c) curing the resin coated fabric under a pressure and a temperature below the melting point of the fabric to cure the resin and form a fabric composite; and
   (d) cooling the composite.

43. The process of claim 42 which further comprises the step of blending the fabric with a plastic.

44. The process of claim 43 wherein the step of heating is above the melting point of the plastic.

45. The process of claim 44 wherein the plastic is a polyolefin.

46. The process of claim 45 wherein the polyolefin is selected from the group consisting of polyethylene and polypropylene.

47. The process of claim 42 which further comprises the step of blending the fabric with a shredded carpet comprising a face yarn, a backing and a fiber adhesive.

48. The process of claim 47 which further comprises the step of blending the fabric and the shredded carpet with a plastic.

* * * * *